United States Patent [19]

Machado

[11] Patent Number: 5,064,901
[45] Date of Patent: Nov. 12, 1991

[54] BLENDS OF POLYKETONES AND CARBOXYLATED, HYDROGENATED BLOCK COPOLYMERS

[75] Inventor: Joseph M. Machado, Richmond, Tex.

[73] Assignee: Shell Oil Company, Houston, Tex.

[21] Appl. No.: 382,379

[22] Filed: Jul. 20, 1989

[51] Int. Cl.$^5$ .............................................. C08L 53/02
[52] U.S. Cl. ..................................... 525/92; 525/539; 525/919
[58] Field of Search ........................... 525/92, 539, 919

[56] References Cited

U.S. PATENT DOCUMENTS

| | | | |
|---|---|---|---|
| 3,694,412 | 9/1972 | Nozaki | 260/63 |
| 4,868,245 | 9/1989 | Pottick et al. | 525/98 |
| 4,904,728 | 2/1990 | George | 525/71 |
| 4,906,687 | 3/1990 | Modic | 525/92 |

FOREIGN PATENT DOCUMENTS 121965 10/1984 European Pat. Off. .
257663 3/1988 European Pat. Off. .

Primary Examiner—Ana L. Carrillo
Assistant Examiner—Thomas Hamilton, III
Attorney, Agent, or Firm—James O. Okorafor

[57] ABSTRACT

Polymer blends comprising a major proportion of linear alternating polymer of carbon monoxide and at least one ethylenically unsaturated hydrocarbon, a minor proportion of a carboxylated, partially hydrogenated two-block copolymer of an alkenyl arene and a conjugated alkadiene and, optionally, a minor proportion of an $\alpha$-olefin/$\alpha,\beta$-ethylenically unsaturated carboxylic acid polymer, demonstrate improved properties of low temperature toughness.

9 Claims, No Drawings

BLENDS OF POLYKETONES AND CARBOXYLATED, HYDROGENATED BLOCK COPOLYMERS

FIELD OF THE INVENTION

The present invention relates to improved polymer blends comprising predominantly a linear alternating polymer of carbon monoxide and at least one ethylenically unsaturated hydrocarbon. More particularly, the invention relates to a blend of the linear alternating polymer with a minor proportion of a carboxylated, partially hydrogenated two-block copolymer and, optionally, a polymer of ethylene and $\alpha,\beta$-ethylenically unsaturated carboxylic acid.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. U.K. 1,081,304 produced similar polymers of higher carbon monoxide content in the presence of alkylphosphine complexes of palladium. Nozaki extended the process of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon, also known as polyketones or polyketone polymers, has become of greater interest in part because of the greater availability of the polymers. The more recent general processes for the production of the polyketone polymers are illustrated by a number of published European Patent Applications including 121,965, 181,014, 213,671, and 257,663. The processes involve the use of a catalyst composition formed from a compound of a Group VIII metal selected from palladium, cobalt or nickel, the anion of a non-hydrohalogenic acid having a pKa below about 6, preferably below 2, and a bidentate ligand of phosphorus, arsenic or antimony.

The resulting polymers are relatively high moleclar weight thermoplastics having established utility in the production of shaped articles such as containers for the food and drink industry which are produced by processing the polymers according to the methods conventional for the processing of thermoplastics. For some particular applications, however, it has been found to be desirable to have properties somewhat different from those of the polyketone polymers. It would be of advantage to retain the desirable properties of the polyketone polymer and yet improve other properties. These advantages are often obtained through the provision of a polymer blend.

In copending U.S. patent application Ser. No. 203,975, filed June 8, 1988, there are disclosed blends of polyketone polymers and maleated, partially hydrogenated block copolymers. In copending U.S. patent application Ser. No. 203,960, filed June 8, 1988 there are described blends of polyketone polymers and copolymers of ethylene and $\alpha,\beta$-ethylenically unsaturated carboxylic acids.

SUMMARY OF THE INVENTION

The present invention provides improved blends of carbon monoxide and ethylenically unsaturated hydrocarbon with other polymeric material. More particularly, the present invention provides blends of the linear alternating polymer with certain carboxylated, partially hydrogenated two-block copolymers and, optionally, copolymer of $\alpha$-olefin and $\alpha,\beta$-ethylenically unsaturated carboxylic acid. Such blends demonstrate improved physical properties of low temperature toughness, without undue loss of stiffness or tensile strength.

DESCRIPTION OF THE INVENTION

The polyketone polymers which are employed as the major component of the blends of the invention are linear alternating polymers of carbon monoxide and at least one ethylenically unsaturated hydrocarbon. Suitable ethylenically unsaturated hydrocarbons for use as precursors of the polyketone polymers have up to 20 carbon atoms inclusive, preferably up to 10 carbon atoms inclusive, and are aliphatic such as ethylene and other $\alpha$-olefins including propylene, 1-butene, isobutylene, 1-hexene, 1-octene and 1-dodecene, or are arylaliphatic having an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, m-isopropylstyrene and p-ethylstyrene. The preferred polyketone polymers are copolymers of carbon monoxide and ethylene or are terpolymers of carbon monoxide, ethylene and a second ethylenically unsaturated hydrocarbon of at least 3 carbon atoms, particularly an $\alpha$-olefin such as propylene.

The structure of the polyketone polymers is that of a linear alternating polymer and the polymer will contain substantially one molecule of carbon monoxide for each molecule of hydrocarbon. When the preferred terpolymers are utilized in the blends of the invention there will be within the terpolymer at least two units incorporating a moiety of ethylene for each unit incorporating a moiety of the second hydrocarbon. Preferably there will be from about 10 units to about 100 units incorporating a moiety of ethylene for each unit incorporating a moiety of the second hydrocarbon. The polymer chain is therefore represented by the following repeating formula

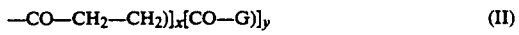

$$-CO-CH_2-CH_2)]_x[CO-G)]_y \quad \text{(II)}$$

wherein G is the moiety of the second ethylenically unsaturated hydrocarbon of at least 3 carbon atoms polymerized through the ethylenic unsaturation. The $-CO-CH_2CH_2-$ units and any $-CO-G-$ units are found randomly throughout the polymer chain and the ratio of y:x is no more than about 0.5. In the modification where the preferred copolymers of carbon monoxide and ethylene are employed there will be no second hydrocarbon present and the copolymers are represented by the above formula I wherein y is 0. When y is other than 0, i.e., terpolymers are employed, the preferred ratio of y:x is from about 0.01 to about 0.1. The end groups or "caps" of the polymer chain will depend upon what materials are present during the production of the polymer and whether or how the polymer has been purified. The precise properties of the polymers do not appear to depend upon the end groups to any considerable extent so that the polymers are fairly represented by the above formula for the polymeric chain. Of particular interest are the polyketone polymers of number average molecular weight from about 1000 to about 200,000, particularly those of number average molecular weight from about 20,000 to about 90,000, as determined by gel permeation chromatography. The physical properties of the polyketone polymers will depend in part on the molecular weight, whether the polymer is a copolymer or a terpolymer and, in the case of terpolymers, the nature of and the proportion of the second hydrocarbon present. Typical melting points of the polymers are from about 175° C. to about 300° C. with polymers of melting points from about 210° C. to about 270° C. being preferred. The polymers will have a limiting viscosity number (LVN), measured in dl/g in m-cresol at 60° C. in a standard capillary viscosity measuring device, from about 0.5 to about 10, preferably from about 0.8 to about 4.

The method for the production of the polyketone polymers is illustrated by the above published European Patent Applications. In a typical modification, the carbon monoxide and hydrocarbon monomers are contacted under polymerization conditions in a reaction diluent in the presence of a catalyst composition formed from a palladium compound, the anion of a non-hydrohalogenic acid having a pKa below 2 (measured in water at 18° C.) and a bidentate ligand of phosphorus. The scope of the polymerization process is extensive but, without wishing to be limited, a preferred catalyst composition is formed from a palladium alkanoate, preferably palladium acetate, the anion of trifluoroacetic acid or p-toluenesulfonic acid and a bidentate phosphorus ligand selected from 1,3-bis(diphenylphosphino)-propane or 1,3-bis[di(2-methoxyphenyl)phosphino]-propane.

The reaction diluent in which the polymerization is conducted is preferably a lower alkanol, e.g., methanol or ethanol, and methanol is particularly preferred. The reactants, catalyst composition and reaction diluent are contacted during polymerization by conventional methods such as shaking or stirring in a suitable reaction vessel. The polymerization conditions include a reaction temperature from about 20° C. to about 150° C. with temperatures in the range from about 50° C. to about 135° C. being preferred. Typical reaction pressures are from about 1 atmosphere to about 200 atmospheres with pressures from about 10 atmospheres to about 100 atmospheres being more commonly employed. Subsequent to reaction the reactor and contents are cooled and the pressure released. The polyketone polymer is generally obtained as a suspension in the reaction diluent and is recovered by well known procedures such as filtration or decantation. The polyketone product is employed in the blends of the invention as recovered or the polymer product is purified as by contact with a solvent or extracting agent which is selective for catalyst residues.

A minor component of the blends of the invention is a carboxylated, partially hydrogenated diblock copolymer. The block copolymers from which the blend component is produced is a two-block polymer containing one block of polymerized at least predominantly alkenyl arene and one block of polymerized at least predominantly conjugated alkadiene. The alkenyl arene portion of the block copolymer is preferably polymerized styrene or alkylated styrene including ring alkylated styrene and side chain alkylated styrene. Such alkenyl arenes are illustrated by styrene, p-methylstyrene, 1,3-dimethylstyrene, α-methylstyrene, o-ethylstyrene, p-t-butylstyrene and m-i-propylstyrene. Of these, styrene and α-methylstyrene are preferred, especially styrene. The polymerized alkenyl arene portion of the block copolymer, commonly termed an "A" block in terminology associated with block copolymers, is a polymerized segment of one or more alkenyl arenes.

The second block of the block copolymer used as precursor of the blend component, commonly termed a "B" block, is polymerized conjugated alkadiene wherein the alkadiene preferably has from 4 to 8 carbon atoms inclusive. Illustrative of such conjugated alkadienes are 1,3-butadiene (butadiene), 2-methyl-1,3-butadiene (isoprene), 2,3-dimethyl-1,3-butadiene, 1,3-pentadiene (piperylene) and 1,3-hexadiene. The preferred conjugated alkadiene monomers are butadiene and isoprene. The B block suitably contains one or more alkadienes but preferably only a single conjugated alkadiene.

The production of the two-block or diblock polymer is accomplished by polymerization procedures which are well known in the art. In a generally preferred procedure, alkenyl arene is polymerized through the use of an alkyl lithium initiator, preferably a secondary-alkyl lithium initiator. The conjugated alkadiene is then added to the resulting mixture to form the polymerized alkadiene portion of the block copolymer. If the polymerization of the alkenyl arene is essentially complete before the conjugated alkadiene is introduced, each block will be a substantially homopolymer block of the monomer employed in its production. Alternatively, if the conjugated alkadiene is introduced before the polymerization of alkenyl arene is complete, each of the resulting blocks is termed "tapered" and contains a relatively small proportion of the monomer of the other block. The production of homopolymeric or tapered block copolymers is well known in the art and both types of diblock copolymers are usefully employed in the production of the component of the blends of the invention, provided that each block is polymerized at least predominantly alkenyl arene or conjugated alkadiene.

Within the B block of the block copolymer, several modifications of structure are possible. In what is termed 1,2-polymerization, the polymerization of the conjugated alkadiene involves only a single carbon-carbon double bond of the conjugated alkadiene and the resulting polymeric chain contains pendant alkenyl groups. Alternatively, in 1,4-polymerization, the polymerization of the conjugated alkadiene involves both carbon-carbon double bonds with all four carbon atoms of the conjugated double bonds being incorporated within the polymer chain which then contains residual ethylenic unsaturation. The extent of 1,2- or 1,4-polymerization and the control of the ratio of these polymerization types is conventional and well known in the art.

Preferably, the blend components of the invention are produced from diblock polymers having elastomeric properties. These polymers will contain B blocks having a 1,2-structure content of from about 40% to about 98%, preferably from about 60% to about 98%. The proportion of A block within the diblock polymer is from about 2% to about 60% based on total polymer, with A block contents of from about 2% by weight to about 40% by weight, same basis, being preferred.

The average molecular weight of the diblock copolymers and the individual blocks thereof will vary within certain limits. The average molecular weight of the diblock copolymers is from about 11,000 to about 700,000. The A block will suitably have an average molecular weight of from about 1,000 to about 125,000, preferably from about 1,000 to about 60,000 while the B block will have an average molecular weight from about 10,000 to about 450,000, preferably from about 10,000 to about 150,000. The molecular weights are most accurately determined by gel permeation chromatography or by gel permeation-low angle light scattering. The production and characterization of these diblock or A-B copolymers is well known and certain of the polymers are commercially available being marketed under the trademark KRATON® by Shell Chemical Company.

To prepare the component of the blends of the invention, the diblock copolymers are hydrogenated and carboxylated. The hydrogenation of the A-B polymers is conducted by a number of well established procedures including hydrogenation in the presence of catalysts such as Raney nickel, noble metals such as platinum or palladium and soluble transition metal catalysts. The hydrogenation processes which are suitably employed to produce precursors of the blend components are those which hydrogenate a substantial proportion of the aliphatic, i.e., ethylenic, unsaturation while hydrogenating at most a small and generally negligible proportion of the aromatic unsaturation. These hydrogenation processes typically include dissolving the block copolymer in an inert hydrocarbon diluent such as cyclohexane and contacting the polymer with molecular hydrogen in the presence of a soluble transition metal hydrogenation catalyst. Such a procedure is entirely conventional and results in the production of partially hydrogenated block copolymers having no more than about 20% residual ethylenic unsaturation in the aliphatic block. Preferred partially hydrogenated polymers have less than 10% of the original ethylenic unsaturation and preferably less than 2% of the original ethylenic unsaturation. These partially hydrogenated block copolymers are conventional and certain of the partially hydrogenated polymers are commercial, being marketed under the trademark SHELLVIS® by Shell Chemical Company.

The component of the blends of the invention is produced from the partially hydrogenated diblock copolymer by a two-step process of metalation and carboxylation. The metalation step serves to incorporate a metallic species as a substituent on a carbon atom of an aromatic ring of the block copolymer and to a lesser extent upon a benzylic carbon atom of the aromatic portion of the copolymer molecule. This step is accomplished by contacting the partially hydrogenated diblock copolymer with a reactive metal compound and an amine promoter. A variety of metal compounds of alkali metals and alkaline earth metals are suitable in the metalation but compounds of alkali metals are preferred. Compounds of sodium, potassium, rubidium or cesium are satisfactory but largely because of availability the compounds most frequently used are lithium compounds. Although other compounds such as the hydrides are useful, the preferred lithium compounds are lithium alkyls wherein the alkyl has up to about 10 carbon atoms. Representative lithium alkyls are methyllithium, isopropyllithium, t-butyllithium and n-dodecyllithium. Sec-butyllithium is a preferred alkyl lithium compound. Metalation takes place in the presence of a reaction promotor to reduce the severity of the conditions under which metalation takes place. The metalation promotor is suitably a diamine having all valences of each nitrogen atom substituted with an alkyl group. Cyclic diamines such as the N,N,N',N'-tetraalkyldiaminocyclohexanes, e.g., N,N,N'N'-tetramethyl-1,2-diaminocyclohexane or N,N,N',N'-tetraethyl-1,4-diaminocyclohexane are suitable, but the preferred amine metalation promoters are the so-called "bridgehead" diamines such as sparteine and triethylenediamine.

The amine metalation promoter is employed in a quantity of from about 0.01 equivalent to about 100 equivalents per equivalent of lithium alkyl, preferably from about 0.1 equivalent to about 10 equivalents of promoter per equivalent of alkyl lithium. The lithium alkyl is employed in a quantity of from about 0.001 equivalent to about 3 equivalents per equivalent of aromatic moiety present in the partially hydrogenated diblock polymer. Quantities of lithium alkyl from about 0.01 equivalent to about 1 equivalent of aromatic moiety are preferred. The metalation reaction is carried out in the liquid phase in an inert reaction diluent which preferably is a saturated aliphatic hydrocarbon such as cyclohexane. Reaction temperatures are generally from about −70° C. to about 150° C. with the range of reaction temperatures from about 25° C. to 75° C. being preferred. The reaction pressure is sufficient to maintain the reaction mixture in the liquid phase. Such pressures are typically up to about 10 atmospheres.

The metalated polymers are recoverable by conventional methods but are customarily further reacted with carbon dioxide in the carboxylation step without isolation. The carboxylation of the metalated, partially hydrogenated diblock copolymer is most easily accomplished by passing gaseous carbon dioxide into the mixture in which the metalated polymer is produced. Reaction conditions similar to those of the metalation process are utilized and carbon dioxide is typically added until no further reaction takes place. The resulting polymer product is the lithium salt of the carboxylated, partially hydrogenated diblock copolymer which is generally soluble in the medium of its production. The carboxylated polymer is obtained upon acidification of the salt. Although a variety of acids both inorganic acid and organic are suitable for this purpose, the preferred acids are organic acids such as acetic acid or citric acid. Acidification of the product mixture containing the salt of the carboxylated polymer produces the carboxylated polymer in the acid form which is generally insoluble and is recovered by conventional methods such as filtration and decantation. The carboxylated polymer is used as recovered and is purified to remove any occluded salt if desired, by conventional methods.

The chemistry of the formation of the carboxylated polymer is not easily depicted because of the complexity of the reaction. However, the overall reaction scheme and illustrative products are illustrated by the following sequence.

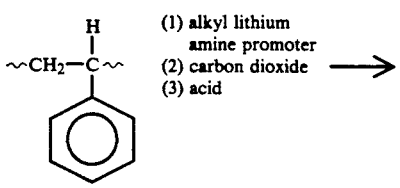

-continued

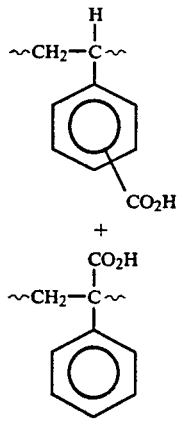

wherein the products are exemplary of principal reaction types and the wavy lines represent uninvolved portions of the polymer molecule. It should be appreciated that the depicted products are illustrative only and other products may and often do occur in minor amounts in which (a) metalation/carboxylation has taken place in the aliphatic portion of the polymer molecule on carbon atoms allylic to residual unsaturation, (b) more than one carboxyl group is introduced onto a single aromatic ring or (c) more than one of the above reaction types has taken place. The carboxylation process generally introduces from about 0.1% by weight of carboxyl group to about 10% by weight of carboxyl group, based on carboxylated, partially hydrogenated diblock polymer. Carboxylated polymers having from about 1% by weight to about 5% by weight on the same basis are preferred.

The production of carboxylated polymers by general processes of metalation and carboxylation are broadly well known and conventional. A general overall process by which these blend components are produced is included within copending U.S. patent application Ser. No. 152,705, filed Feb. 5, 1988, which also provides general statements about incorporation of functionalized, partially hydrogenated block copolymers in engineering thermoplastics.

In the blends of the invention, a third component is optionally present. This optional component is a polymer of an α-olefin and an α,β-ethylenically unsaturated carboxylic acid. The α-olefin portion of the optional blend component is an α-olefin of up to 10 carbon atoms inclusive such as ethylene, propylene, 1-butene, isobutylene, 1-octene and 1-decene. Preferred α-olefins are straight-chain α-olefins of up to 4 carbon atoms inclusive, especially ethylene or propylene. Ethylene is particularly preferred. The α,β-ethylenically unsaturated carboxylic acid is a 2-alkenoic acid of up to 10 carbon atoms and is illustrated by acrylic acid, methacrylic acid, 2-hexenoic acid and 2-decenoic acid. The preferred unsaturated carboxylic acids have up to 4 carbon atoms inclusive and these acids are acrylic acid, methacrylic acid and crotonic acid, of which acrylic acid and methacrylic acid are particularly preferred. The α,β-ethylenically unsaturated carboxylic acid is present in the polymer with α-olefin in an amount from about 1% by mol to about 30% by mol, based on total polymer. Amounts of unsaturated acid from about 1% by mol to about 15% by mol on the same basis are preferred.

The optional blend component is suitably a copolymer of the α-olefin and the α,β-ethylenically unsaturated carboxylic acid and in general such copolymers are preferred. On occasion, however, it is useful to include within the polymer as an optional additional monomer a non-acidic, low molecular weight polymerizable monomer of up to 8 carbon atoms inclusive. Such optional monomers may be additional α-olefins such as propylene or styrene when ethylene is the major α-olefin, unsaturated esters such as vinyl acetate, methyl methacrylate and butyl acrylate, unsaturated halohydrocarbons such as vinyl fluoride and vinyl chloride and unsaturated nitriles such as acrylonitrile. As previously stated, the presence of this third non-acidic polymerizable monomer is optional and is not required. The third component is provided in amounts up to about 5% by mol, based on total polymer; with amounts up to 3% by mol on the same basis being preferred.

The production of the optional third blend component is by well known methods. A number of the ethylene/unsaturated acid copolymers are commercial, being marketed under the trademark NUCREL ® by DuPont and under the trademark PRIMACORE ® by Dow Chemical Company.

The blends of the invention comprise a major proportion of the linear alternating polymer of carbon monoxide and at least one ethylenically unsaturated hydrocarbon, a minor amount of the carboxylated, partially hydrogenated diblock copolymer and, optionally, a minor amount of the α-olefin-unsaturated acid polymer. The precise quantity of the carboxylated, partially hydrogenated diblock copolymer is not critical and quantities of this component from about 0.5% by weight to about 35% by weight, based on total polymeric blend, are satisfactory. Amounts of the carboxylated polymer from about 1% by weight to about 20% by weight on the same basis are preferred. The presence of the α-olefin/unsaturated acid polymer component is optional and is not required. If present, amounts of the α-olefin/unsaturated acid polymer up to about 10% by weight based on total polymer blend are satisfactory and when present the α-olefin/unsaturated acid polymer is preferably present in an amount from about 0.1% by weight to about 5% by weight on the same basis.

The method of producing the blends of the invention is not material so long as an intimate mixture of the components, i.e., a uniform mixture that will not delaminate upon processing, is obtained. The blend of polyketone polymer, carboxylated polymer and optionally α-olefin/unsaturated copolymer will be a non-miscible blend with the carboxylated polymer and, if present, the olefin/unsaturated acid polymer existing as a discrete phase within a continuous polyketone polymer phase. The blend will not, of course, be homogeneous but good results are obtained if the distribution of the other blend component(s) throughout the polyketone polymer matrix is uniform. The method of blending the components is that which is conventional for the blending of non-miscible polymeric materials. In one modification the components are blended by passage through a co-rotating twin screw extruder operating at high RPM. In an alternate modification the components are blended in a mixing device exhibiting high thermal energy and shear.

The blends of the invention may also contain conventional additives such as antioxidants, stabilizers, fillers, fire retardant materials, mold release agents or other substances which are added to improve the processability of the component polymers or to modify the properties of the resulting blend. Such additives are added prior to, together with, or subsequent to the blending of the components.

The blends of the invention are thermoplastic materials having improved properties of low temperature toughness without undue loss of stiffness or tensile strength. The blends are processed by methods conventional for the processing of thermoplastics, e.g., extrusion, injection molding or thermoforming, into shaped articles of established utility. The advantages of the blends are most apparent when used to produce finished articles likely to be subjected to reduced temperatures, for example, containers for frozen or refrigerated food or drink.

The invention is further illustrated by the following Illustrative Embodiments which should not be regarded as limiting the invention.

ILLUSTRATIVE EMBODIMENT I

A linear alternating terpolymer of carbon monoxide, ethylene and propylene was produced in the presence of a catalyst composition formed from palladium acetate, trifluoroacetic acid and 1,3-bis[di(2-methoxyphenyl)phosphino]propane. The terpolymer had a melting point of 219° C. and an LVN, measured in m-cresol at 60° C., of 1.78 dl/g.

ILLUSTRATIVE EMBODIMENT II

Various blends were made of the following components:

Component A: The terpolymer of Illustrative Embodiment I.

Component B: A carboxylated, partially hydrogenated diblock copolymer of styrene and butadiene. The polymer is derived from SHELLVIS 50 ®, a commercial partially hydrogenated diblock copolymer, is carboxylated to the extent of 1.5% by weight in the aromatic portion and is in the acid form.

Component C: A copolymer of ethylene and methacrylic acid containing 94% by weight ethylene, marketed as NUCREL ® 535 by DuPont.

The blends were compounded on a Haake 30 mm twin screw co-rotating extruder with a L/D ratio of 13. Test specimens were prepared on a 25 mm Arburg injection molding machine with a L/D ratio of 18. Samples were stored over desiccant until testing.

The impact properties of the blends were evaluated by determining notched Izod at room temperature and at 0° C. by standard ASTM techniques. The results are shown in Table I.

TABLE I

| Blend Component, pph | | | IZOD (R.T.) | IZOD (0° C.) |
|---|---|---|---|---|
| A | B | C | ft lb/in | ft lb/in |
| 100 | | | 4.2 | 1.5 |
| 99 | — | 1 | 4.7 | 1.6 |
| 94 | 5 | 1 | 7.4 | 2.4 |
| 79 | 20 | 1 | 4.9 | 2.4 |

The modulus and strength of these blends was also determined by standard techniques. The results are shown in Table II.

TABLE II

| Blend Component, pph | | | Modulus | Tensile Strength |
|---|---|---|---|---|
| A | B | C | (ksi) | (psi) |
| 100 | 0 | 0 | — | 8820 |
| 100 | 0 | 1 | 217 | 8470 |
| 95 | 5 | 1 | 216 | 8820 |
| 80 | 20 | 1 | 176 | 6650 |

What is claimed is:

1. A polymer blend composition consisting essentially of:
   (a) a major proportion of a linear alternating polymer of carbon monoxide and at least one ethylenically unsaturated hydrocarbon,
   (b) a minor portion of a carboxylated, partially hydrogenated two-block copolymer of an alkenyl arene and a conjugated alkadiene, wherein said carboxylated partially hydrogenated two block copolymer is formed by introducing from about 0.1% by weight to about 10% by weight of carboxyl group, based on total carboxylated polymer, onto primarily the aromatic portion of a partially hydrogenated diblock copolymer, the hydrogenation copolymer having no more than 20% of the ethylenic unsaturation of the diblock copolymer from which it was formed, which diblock copolymer comprises a block of at least predominantly polymerized styrene or β-methylstyrene and a block of at least predominantly polymerized butadiene or isoprene; and optionally,
   (c) a polymer of an α,β-ethylenically unsaturated carboxylic acid.

2. A composition as in claim 1 wherein said linear alternating polymer is represented by the repeating formula $$-CO-CH_2-CH_2)_x[CO-G)]_y$$

wherein G is a moiety of ethylenically unsaturated hydrocarbon of at least 3 carbon atoms polymerized through the ethylenic unsaturation and the ratio of y:x is no more than about 0.5.

3. A composition as in claim 2 wherein y is 0.

4. A composition as in claim 2 wherein G is a moiety of propylene and the ratio of y:x is from about 0.01 to about 0.1.

5. A composition as in claim 1 wherein said polymer blend contains from about 0.5% by weight to about 35% by weight, based on total polymer blend, of the carboxylated, partially hydrogenated diblock copolymer.

6. A composition as in claim 1 wherein said diblock copolymer contains from about 2% by weight to about 60% by weight, based on diblock polymer, of a block of at least predominantly polymerized styrene.

7. A composition as in claim 1 wherein said partially hydrogenated diblock copolymer contains less than about 2% by weight of the ethylenic unsaturation of the diblock polymer.

8. A composition as in claim 1 wherein said carboxylated, partially hydrogenated diblock copolymer has from about 1% by weight to about 5% by weight of carboxyl group, based on total carboxylated polymer.

9. A composition as in claim 1 wherein said polymer of α-olefin and unsaturated carboxylic acid is a copolymer of ethylene and acrylic acid or methacrylic acid.

* * * * *